(12) United States Patent
Denslow

(10) Patent No.: US 7,351,022 B2
(45) Date of Patent: Apr. 1, 2008

(54) UNIFIED MULTI-PART HEAD FOR A STAKED FASTENER

(76) Inventor: Clark A. Denslow, 69 Webster Point Rd., Madison, CT (US) 06443

( * ) Notice: Subject to any disclaimer, the term of this patent is extended or adjusted under 35 U.S.C. 154(b) by 0 days.

(21) Appl. No.: 10/955,174

(22) Filed: Sep. 30, 2004

(65) Prior Publication Data

US 2006/0067806 A1 Mar. 30, 2006

(51) Int. Cl.
*F16B 19/04* (2006.01)

(52) U.S. Cl. .................. 411/501; 411/900; 411/908

(58) Field of Classification Search ............. 411/501, 411/504–507, 900, 908
See application file for complete search history.

(56) References Cited

U.S. PATENT DOCUMENTS

| | | | | |
|---|---|---|---|---|
| 1,620,043 | A | * | 3/1927 | Stanley ............... 192/107 R |
| 2,510,693 | A | * | 6/1950 | Green .................. 411/501 |
| 2,685,813 | A | * | 8/1954 | Lampman et al. ........... 87/1 |
| 4,478,543 | A | | 10/1984 | Lyon |
| 4,478,544 | A | | 10/1984 | Strand |
| 4,687,395 | A | | 8/1987 | Berecz |
| 4,687,396 | A | | 8/1987 | Berecz |
| 4,687,397 | A | | 8/1987 | Berecz |
| 4,687,398 | A | | 8/1987 | Berecz |
| 4,718,801 | A | | 1/1988 | Berecz |
| 4,877,362 | A | * | 10/1989 | Berecz et al. ............. 411/34 |
| 5,083,888 | A | * | 1/1992 | Gapp et al. ............... 411/5 |
| 5,086,997 | A | * | 2/1992 | Glass ................. 244/123.3 |
| 5,098,240 | A | | 3/1992 | Gapp |
| 5,127,783 | A | * | 7/1992 | Moghe et al. ............ 411/411 |
| 5,153,978 | A | | 10/1992 | Simmons |
| 5,314,282 | A | | 5/1994 | Murphy |
| 5,361,483 | A | | 11/1994 | Rainville |

* cited by examiner

*Primary Examiner*—Flemming Saether
(74) *Attorney, Agent, or Firm*—William B. Gowanlock

(57) ABSTRACT

A unified head for a staked fastener wherein the unified head is made from a first member in combination with a supplemental member, and the two members have at least one shared fiber. In a staking operation that forms the unified head, the operation is conducted in such a manner that a portion of a fiber, initially within the first member or the supplemental member, crosses the boundary therebetween creating the shared fiber, i.e., a segment of a single fiber is embedded in the first member and a segment is embedded in the supplemental member.

25 Claims, 6 Drawing Sheets

UNIFIED MULTI-PART HEAD FOR A STAKED FASTENER

FIELD OF THE INVENTION

The present invention relates to fasteners and more specifically to fasteners formed by staking, such as studs and rivets.

BACKGROUND

Staked fasteners, such as studs and rivets, are a well-known fastening technology. Studs are typically used to secure a body, such as a circuit board, to a foundation. Rivets, on the other hand, are typically used to fasten two bodies, such as sheet materials, together at an overlapping seam. For either a stud or a rivet, fastening is accomplished by the creation of a head on a shank. In the case of a stud having two ends, a head is formed on one end of the shank with the other end fixed to the foundation with the body therebetween. In the case of a rivet, heads are formed on both ends of the shank with the bodies therebetween.

A staked fastener can be made from many materials, such as steel, aluminum and plastic. Where weight is a concern, such as in an airplane, helicopter, or spacecraft, materials with high strength-to-weight ratios, such as plastic, are preferred. Unfortunately, plastic rivets simply do not have the ultimate strength of rivets made from other materials. As a result, plastic rivets, though desirable for many applications, cannot be practicably used, or in some cases used at all.

There have been many advances in the plastic rivet. From an initial beginning when plastic rivets were simply all plastic, such as a thermoplastic (e.g., polyetheretherketone (more commonly known as "PEEK")), newer composite plastic rivets have some type of reinforcement added to the plastic. For example, many composite plastic rivets are reinforced with fibers, such as carbon or glass.

Rivets are typically formed in a two step process. First, an initial head is formed with a shank extending therefrom. Generally, the initial head is formed in a factory setting by a machine, by molding or staking an end of a rod, which tends to make a high quality initial head with a properly contoured contact surface (the surface of the head that will abut the body). Also, additional fabrication of the initial head, such as cleanup of the contact surface, can be performed relatively easily.

Then in an application, a second head is formed in situate on the end of the shank. More specifically, when a rivet is used in an application, such as connecting two bodies, a hole is made in each of the two bodies. The diameter of the holes is sized such that when the holes are aligned with each other the shank can pass through, but the initial head can not pass through the first hole that the shank passed through. The second head is then formed on the other end of the shank, thereby securing the two bodies together.

Unlike the initial head, the second head is formed at the job site, typically using a hand held tool, thus the conditions are not as controlled as those during the formation of the initial head. Additionally, cleanup of its contact surface is impossible, as it is abutting the body. As a result, the precision of the contact surface of the second head is generally not to the level of that of the contact surface of the initial head. This discrepancy results in a second head with less strength than the initial head.

More specifically, many processes used on plastic rivets to form the second head create voids in the contact surface of the rivet head. As a result, the head has a local weakness at its parameter edge. If pressure is applied thereto, it will cause a local failure of the head. These local failures result in "play" between the rivet and body, thereby creating the unacceptable amount of movement between the head and the shaft, causing the rivet to fail.

What is needed in the art is a staked fastener head and way to make the head such that the resulting rivet, or stud, is stronger than it otherwise would be.

SUMMARY OF THE INVENTION

This invention is a unified head and a method for making it for a staked fastener, such as a rivet. In an exemplary embodiment of a rivet employing the unified head, a shank with two ends has an initial head formed at one end. Proximate the other end is at least one fiber embedded in the shank. In an application, the shank is passed through a body and a unified head is formed by staking the shank's other end, thereby trapping the body between the heads. In forming the unified head, a first member is created from a clinch portion of the shank (which has at least a portion of the at least one fiber therein), and a supplemental member placed proximate the first member such that the supplemental member is trapped during staking between the forming first member and the body. Additional sufficient energy is applied during staking such that at least one of the at least one fibers will become a shared fiber (a fiber having one segment embedded in the supplemental member and another segment embedded in the first member).

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

DETAILED DESCRIPTION

Figure 1:
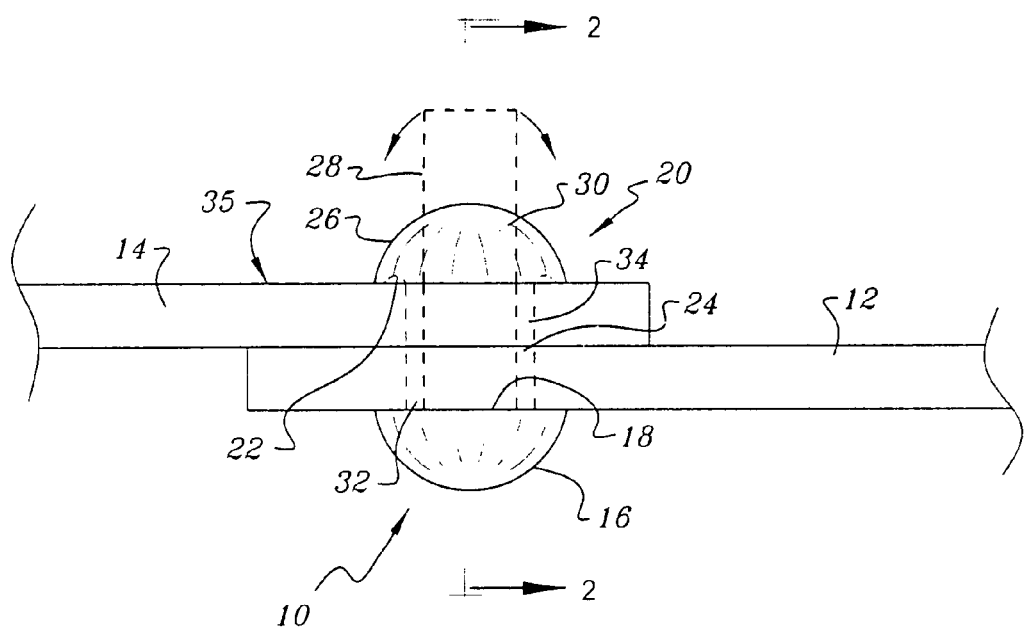
FIG. 1 shows a side view of a rivet connecting two bodies having a unified head of the present invention.

Referring to FIG. 1, a rivet, generally referred to by reference number 10, secures a first body 12, such as a sheet material, to a second body 14, such as a sheet material. The rivet 10 has an initial head 16 having a contact surface 18, a unified head (generally referred to by reference number 20) having a contact surface 22, and a grip member 24. The unified head 20 has a first member 26, which is formed from a clinch portion 28, and a supplemental member (not easily seen in this view, discussed below).

The grip member 24 and the clinch portion 28 are separate segments of a shank 30, which extends outwardly from the initial head 16. In the embodiment depicted in FIG. 1, the grip member 24 is that segment of the shank 30 passing through holes 32, 34, which are defined by the first and second bodies 12, 14. The clinch portion 28 (depicted by dotted lines) is the segment of the shank 30 extending outwardly beyond a surface 35 of the second body 14. As those skilled in the art will appreciate, the precise demarcation between the grip member 24 and the clinch portion 28 of the shank 30 is a function of the style of head (flush, as shown, or countersunk), which determines the contact surface of the head. Thus, the demarcation point should not be strictly construed to begin at the surface of the body from which the shank extends, as shown in this exemplary embodiment. Additionally, the use of additional elements, such as washers, may alter the demarcation point. Also, it should be appreciated that the initial head 16 could be formed from another clinch portion of a rod (not shown), thereby creating the shank 30 with the initial head 16. It should also be appreciated that the initial head 16 could be of the same structure as the unified head 20.

Figure 2A:
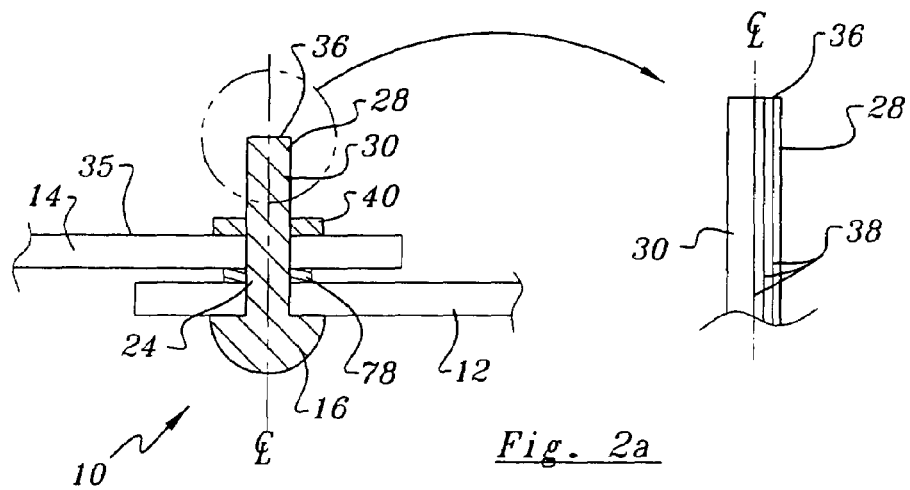
FIG. 2 is a series of three drawings, individually identified as A, B, and C, each taken along cross-section 2-2 of FIG. 1, showing the creation of a unified head of the present invention.

Referring to the series of Figures that comprise FIG. 2, the rivet 10 has the unified head 20 formed in the following manner. As shown in FIG. 2A, the rivet 10 originally has the initial head 16 and the shank 30, with the grip member 24 and the clinch portion 28, which has an end 36. An enlarged view of the clinch portion 28 of FIG. 2A, shows at least one fiber 38 contained therein. The at least one fiber 38 in the clinch portion 28 is oriented generally parallel to the centerline of the shank 30.

A supplemental member 40 is collocated with the clinch portion 28 of the shank 30 proximate the second body 14. Further discussion of the supplemental member 40 is presented below.

Figure 2B:
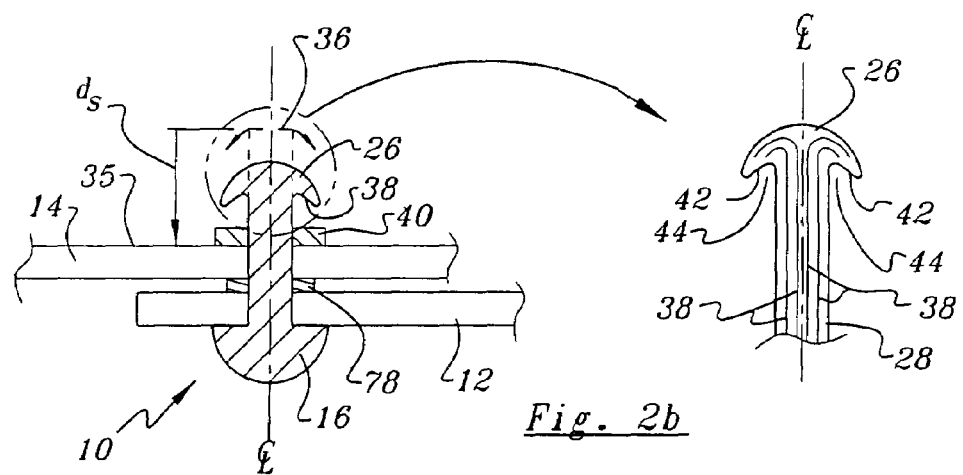
Figure 2C:
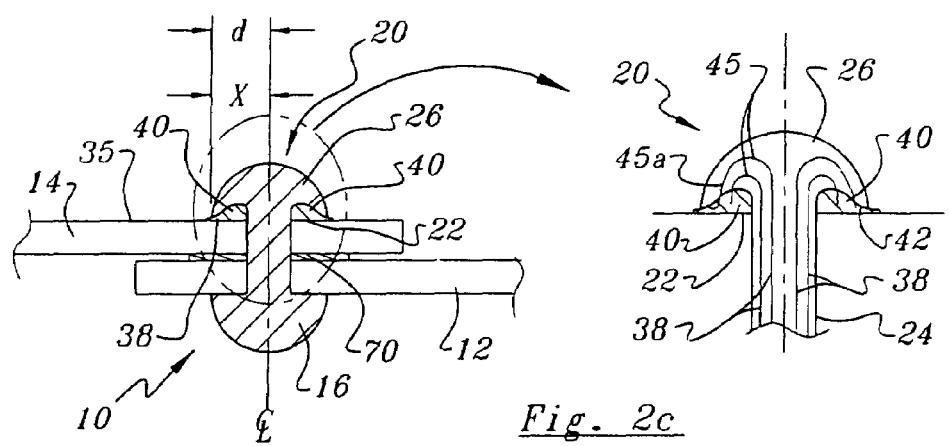

Continuing with FIGS. 2B and 2C, the first member 26 is formed by staking the end 36 of the clinch portion 28 with a staking tool (not shown). The staking operation continues over a distance $d_s$ until the unified head 20 is formed.

As shown in the expanded view of FIG. 2B, the staking operation, which may utilize a staking tool, such as one having a semi-hemispherical shape (not shown), tends to bend the at least one fiber 38 in the first member 26 toward a perimeter segment 42, which will eventually abut the supplemental member 40. A void 44 defined by the perimeter segment 42 of the first member 26 may be formed during the staking operation.

As shown in FIGS. 2B and 2C, the staking operation brings the first member 26 into contact with the supplemental member 40. The energy from the staking operation enters the supplemental member 40 causing it to deform to the contour of the perimeter segment 42, entering the void, and forming at least part of the contact surface 22 of the unified head 20.

The staking procedure imparts to at least one of the at least one fibers 38 and the supplemental member 40 sufficient energy such that a portion of those fibers cross the boundary and become embedded in the supplemental member 40. As a result, at least one of the at least one fibers 38 will become a shared fiber 45. The shared fiber 45 being a fiber that is simultaneously embedded in the first member 26 and the supplemental member 40. In other words, the shared fiber 45 will have a segment embedded in the first member 26 and a segment embedded the in supplemental member 40. As shown in FIG. 2C in the expanded view, a shared fiber 45a could cross the perimeter segment 42 more than once.

The staking method employed depends upon the materials selected for the clinch portion 28 and the supplemental member 40. For example, where the clinch portion 28 and the supplemental member 40 are plastic, such methods as ultrasonic and/or induction could be used.

The staking procedure to create a shared fiber 45, however, is different than conventional procedures. In a standard ultrasonic procedure, the staking procedure is controlled by the distance $d_s$ the staking tool must travel to accomplish the formation of the relevant head. More specifically, sufficient energy is applied to the clinch portion 30 via the staking tool to cause the clinch portion to flow thereby allowing the staking tool to act on the clinch portion to travel the distance $d_s$ to deform the clinch portion into a desired head shape. Once the desired head shape is accomplished, i.e., the travel distance $d_s$ has been accomplished, the energy is removed, but the staking tool is held in position for some hold time. The hold time allows the head, which is under the staking tool and still fluid enough to flow, to cool sufficiently so that the staking tool can be removed without the clinch portion further flowing. In the procedure of the invention, there is fixer step in the staking procedure that occurs after the travel distance $d_s$ has been accomplished prior to the hold. In the fixer step, energy is still applied, generally at the level previously used, to the pre-head (the head as it exists immediately after the travel distance $d_s$ has been reached). The fixer step adds additional energy to the pre-head to create the shared fiber 45, thereby converting the pre-head to a unified head 20. The amount of energy is application dependent depending on such factors as the materials used in the pre-head and their associated masses. Depending upon the degree of additional energy added during the fixer step and the materials used, the supplemental member 40 and the first member 26 may merely be welded to each other or may form a coherent mass.

If induction staking is used, materials that generate heat when exposed to induction energy would most likely have to be present in the clinch portion 30, but could be present elsewhere, such as in the supplemental member 40.

Figure 3:
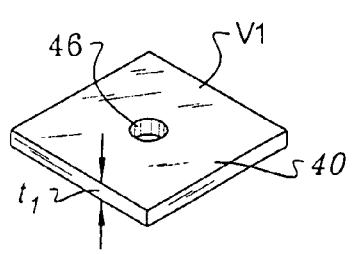
FIG. 3 shows a perspective view of a style of supplemental member for use in the present invention.
Figure 4:
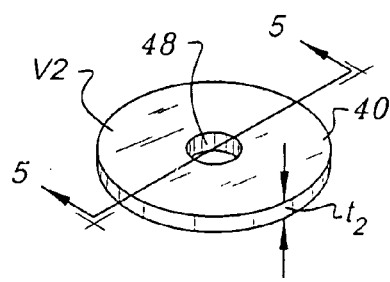
FIG. 4 shows a perspective view of another style of supplemental member for use in the present invention.
Figure 11:
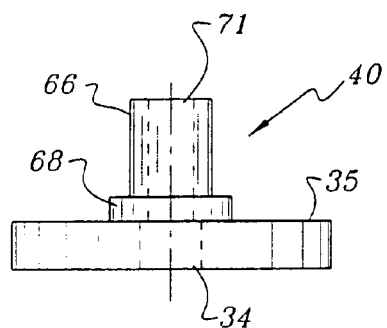
FIG. 11 is a side view of another embodiment of a supplemental member.

The supplemental member 40 can be of almost any shape, such as a rectangular solid (FIG. 3), a washer (FIG. 4), a keyed structure (FIG. 6), or a graduated structure (FIG. 11). Typically these types of structures have a hole 46, 48, 50 and 71, which is defined by the supplemental member 40, sized to allow the clinch portion 28 of the shank 30 to pass through.

The supplemental member 40 should have a sufficient initial volume V1, V2, V3, V4 to permit it to at least fill the void 44. The supplemental member 40 may have a greater volume than that necessary to fill the void 44 that will simply flow out during the staking operation. As those skilled in the art will appreciate, some material of the first member 16 may also flow out from under the staking tool as it travels the distance $d_s$, causing a decrease in the density of the first member 16. Therefore, the volume V1, V2, V3, V4 of the supplemental member 40 may be sufficiently increased above that required to fill the void 44 to compensate for this loss in density.

Figure 5:
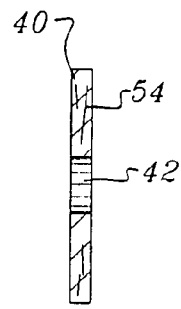
FIG. 5 is a cross-sectional view of the supplemental member shown in FIG. 4 taken along line 5-5.

As depicted in FIG. 5, at least one fiber 54 could be incorporated in the supplemental member 40. It is, therefore, within the scope of the invention if at least one of the at least one fibers 54 from the supplemental member 40 becomes a shared fiber 45 regardless of whether the clinch portion 28 of the shank 30 has fibers or not.

Figure 6:
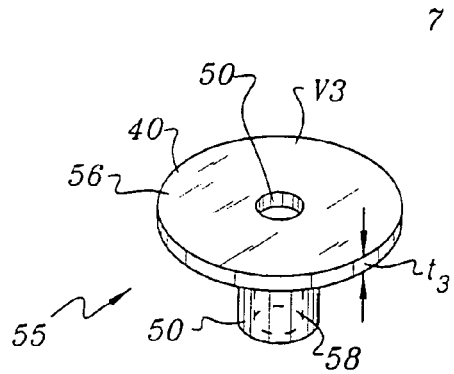
FIG. 6 is a perspective view of another style of supplemental member for use in the present invention.
Figure 7:
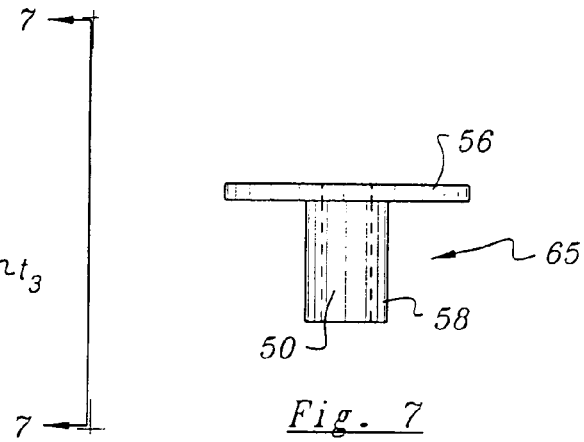
FIG. 7 is a side view of the supplemental member depicted in FIG. 6.
Figure 8:
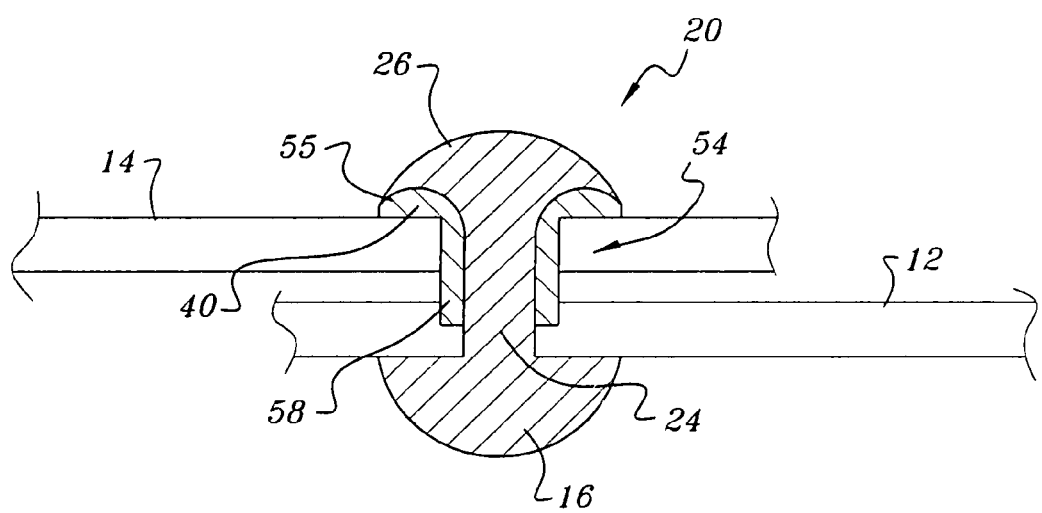
FIG. 8 is a cross-sectional view of the supplemental member depicted in FIG. 6 used in an application.

Referring to FIGS. 6, 7, 8, 9 and 10, the supplemental member 40 may be a keyed structure. As shown in FIGS. 6 and 7, a supplemental member 40 has a keyed structure of a top-hat design having a brim 56 with a crown 58 extending therefrom. In one application, the crown 58 is inserted into the hole 34 of the second body 14, and the shank 30 of the rivet 10 is inserted through the hole 54 such that the clinch portion 28 extends outwardly from the brim 56. As shown in FIG. 8, in a keyed structure, a portion, i.e., a key, of the supplemental member 40, such as the crown 58, can be positioned between the grip member 24 of the shank 30 and the second body 14 and even into the first body 12.

The keyed structure may also have the additional feature of a non-rotational cross-sectional shape such that in cooperation with the cross-sectional shape of the hole the supplemental material will not rotate within the hole defined by the body, or bodies. For example referring to FIGS. 9 and 10, the hole 34 and the supplemental member 40 could have a crown 58 with a complementary rectangular cross-sections, or a corresponding protrusion 62 and slot 64.

Figure 10:
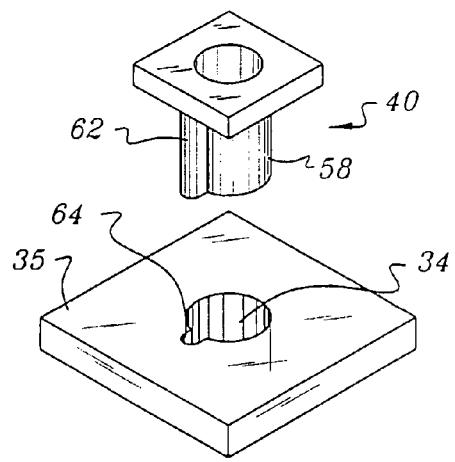
FIG. 10 is an expanded perspective view of another embodiment of a supplemental member.

The supplemental member 40 may also be graduated. Referring to FIG. 11, an example of a graduated design for a supplemental member 40 in the form of a top-hat having a brim 66 and a crown 68. In application, the crown 68 would most likely extend outwardly from the surface 35; however as shown in FIG. 10 the graduated member could have the opposite orientation. Depending upon the application, other graduated shapes, such as frustum of pyramid, could be used.

Figure 12:
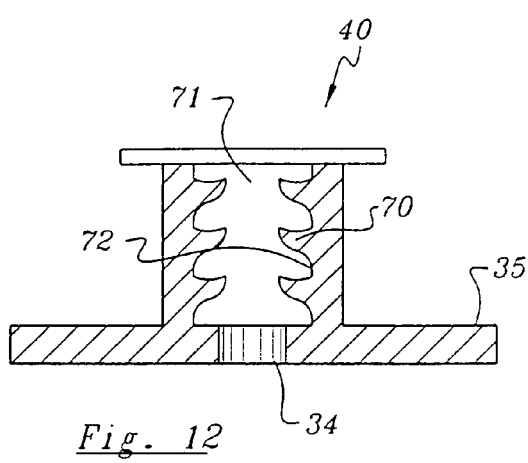
FIG. 12 is a side view of the supplemental member depicted in FIG. 11 having another orientation.
Figure 9:
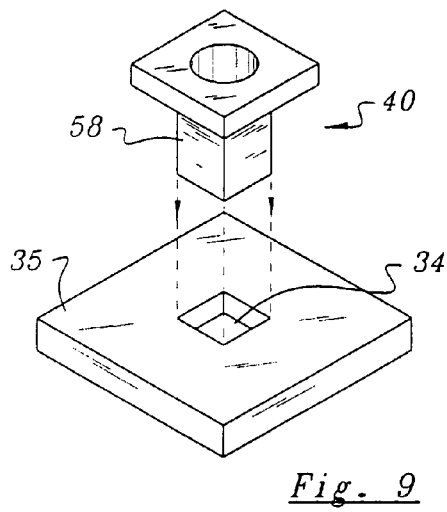
FIG. 9 is an expanded perspective view of another embodiment of a supplemental member.

The supplemental member 40 may also be designed to engage the clinch portion. Engagement could be by friction or mechanical fastener. As shown in FIG. 12, the fastener could be grips 70 for engaging the clinch portion 28 extending outwardly from a surface 72 that defines the hole 71. The fastener could be of a one-way design, i.e., the fastener is broken to effectuate removal of the supplemental member 40.

Figure 13:
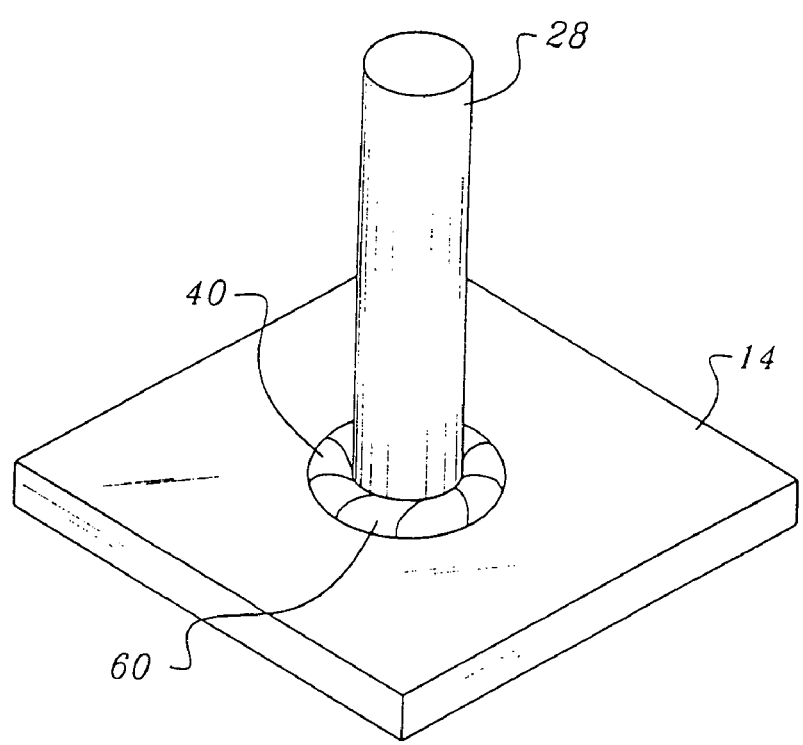
FIG. 13 is yet another style of supplemental member for use in the present invention.

Referring to FIG. 13, the supplemental member 40 could also be a wrap 60, such as a cord or tape, applied around the rivet 10, most likely the grip member 28 proximate the second body 14. The cross-section of the wrap 60 could be any shape.

Figure 14:
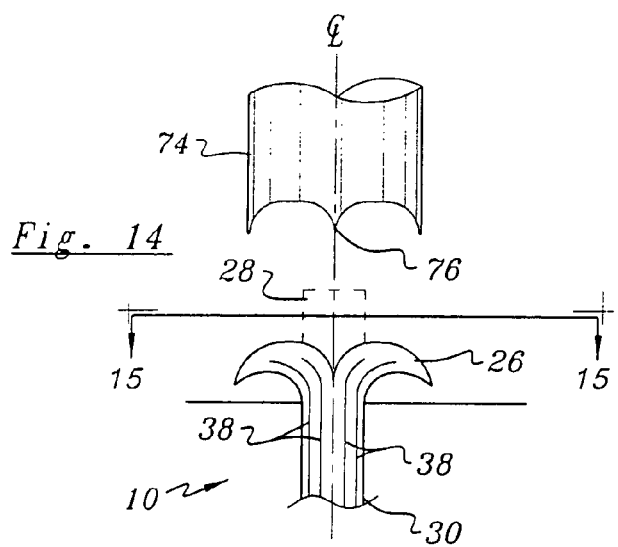
FIG. 14 is a cross-sectional side view of another shape of a first member of the present invention.
Figure 15:
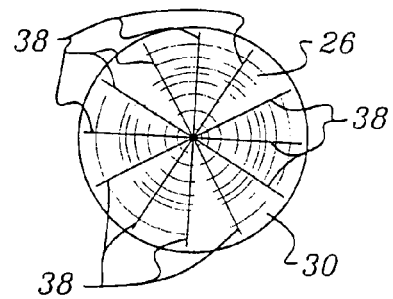
FIG. 15 is a top view of the first member depicted in FIG. 14.

While the results of a hemispherical shaped head for a staking tool have been previously depicted, other shapes can be used. FIGS. 14 and 15 depict a symmetrical unified head 20. The symmetrical head 20 has a first member 26 where the at least one fibers 38 generally extend radially from the centerline of the clinch portion 28. This symmetry is accomplished by using a staking tool 74 with a shank center locator 76. The shank center locator 76 penetrates into the clinch portion 28 of the shank 30 on the longitudinal axis causing the at least one fibers 38 to be splayed radially outwardly therefrom.

Materials for the rivet 10 and supplemental member 40 are a matter of design choice. Typical plastics, which include thermoplastics, such as PEEK or polyetherimide (more commonly known as PEI), are particularly well suited for the invention. As discussed above, staking may cause a weld to occur between the material of the rivet 10 and the supplemental member 40 and even between the rivet and/or the supplemental member and the second body 14.

As those skilled in the art will appreciate, the strength of the weld or whether a coherent mass is formed between the first member 26 and supplemental member 40 is, among other things, dependent upon the materials from which the rivet and supplemental member are made. If the rivet and supplemental member are made from compatible or the same material, the weld could be stronger and the coherent mass more uniform than it might otherwise be.

Any fibers can be embedded into the plastic of the rivet 10 or supplemental member 40. Fibers are also a matter of design choice and may include carbon or glass. Carbon fibers are particularly strong and lightweight.

The at least one fiber 38 in the shank 30 has been depicted in FIG. 2 as being oriented generally parallel with the centerline of the shank 30, but the at least one fibers could have any orientation. Where there are two or more fibers 38 in the shank 30, they could be randomly oriented one to the other. Additionally, the at least one fibers 38 can be of any length, even running from end to end through the grip portion and clinch portions of a rod (not shown) from which the rivet 10 was created. Also in the case of multiple fibers 38, fibers of varying lengths could be used. Therefore, depending upon the length of the particular fibers in the first member 26, a majority of the length of the shared fiber 45 could be in the first member, or in the supplemental member 40. This is equally true for the at least one fibers 54 incorporated in the supplemental member 40.

Referring to FIG. 2, a filler 78 maybe added about the grip member 24 between the two bodies 12, 14. The filler 78 can be of any shape, such as a washer, and be made from any number of materials to meet any particular need. For example, the filler 78 could contain a rubber or neoprene to provide a seal, or an adhesive, such as a 100% solids adhesive, that would be activated, in the case of a 100% solids adhesive melt and flow, as a result of the staking operation for providing additional bonding between the first and second bodies 12, 14.

Figure 16:
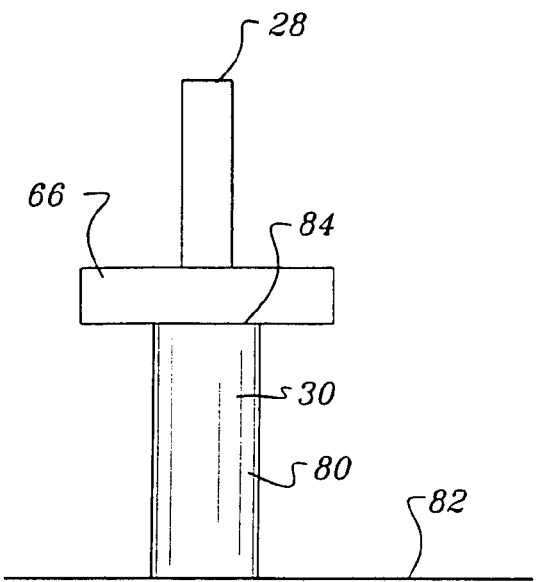
FIG. 16 is a cross-sectional view of a stud employing a supplemental member.

Referring to FIG. 16, in the case of a stud 80 having one end affixed to a foundation 82, it would be beneficial to create a stop 84 to support the filler 78. The stop 72 could be created in any number of ways such as by a notch in or taper of the shank 30.

While there has been illustrated and described what is at present considered to be preferred and alternative embodiments of the claimed invention, it will be appreciated that numerous changes and modifications are likely to occur to those skilled in the art. For example, while the unified head has been shown for a rivet, it is equally applicable for use with a stud. In addition, the unified head could be used for both heads of a rivet. Also, the use of the singular should be interpreted to mean at least one unless the specification makes such expressly clear. It is intended in the appended claims to cover all those changes and modifications that fall within the spirit and scope of the claimed invention.

What is claimed is:

1. A unified head for a staked fastener comprising:
    a first member;
    a supplemental member, the first member and the supplemental member sharing a perimeter segment, and
    a shared fiber having a first segment and a second segment, the shared fiber spanning the perimeter segment having the first segment embedded in the first member and the second segment embedded in the supplemental member
    whereby the shared fiber unifies the first member with the supplemental member.

2. The unified head of claim 1 wherein the supplemental member has a key.

3. The unified head of claim 2 wherein the key has a non-rotational cross-sectional shape.

4. The unified head of claim 1 wherein the supplemental member is between the first member and a body.

5. The unified head of claim 1 wherein a majority of the shared fiber is in the first member.

6. The unified head of claim 1 wherein the shared fiber is created by a staking operation applied to the first member and the supplemental member.

7. The unified head of claim 1 wherein the first member contains thermoplastic and the supplemental member contains thermoplastic.

8. The unified head of claim 1 further including a shank extending from the combined first member and supplemental member.

9. The unified head of claim 8 wherein the supplemental member has at least one fiber.

10. The unified head of claim 1 wherein the supplemental member prior to creation of the unified head is a washer shape.

11. The unified head of claim 1 wherein the supplemental member prior to creation of the unified is a rectangular shape.

12. The unified head of claim 1 wherein the supplemental material includes grips.

13. The unified head of claim 1 wherein the supplemental member prior to creation of the unified head is a graduated shape.

14. The unified head of claim 13 wherein the graduated shape is a top hat shape with a brim and a crown.

15. The unified head of claim 14 wherein the first member includes a clinch portion, and the clinch portion initially contacts the crown.

16. The unified head of claim 14 wherein the first member includes a clinch portion, and the clinch portion initially contacts the brim.

17. The unified head of claim 1 wherein the supplemental material includes a protrusion.

18. The unified head of claim 1 wherein the supplemental material includes a portion with a non-circular cross-section.

19. The unified head of claim 1 wherein the supplemental member is a wrap.

20. A fastener comprising:
    a unified head including a first member; a supplemental member, the first member and the supplemental member sharing a perimeter segment, and a shared fiber having a first segment and a second segment, the shared fiber spanning the perimeter segment having the first segment embedded in the first member and the second segment embedded in the supplemental member,
    another head, and
    a grip member extending therebetween.

21. The fastener of claim 20 wherein the other head is a unified head.

22. The fastener of claim 20 further including a filler collocated with the grip member and positioned between the unified head and the other head.

23. The fastener of claim 22 wherein the filler does not contact the unified head or the other head.

24. The fastener of claim 22 wherein the filler contains 100 percent solid adhesive.

25. The fastener of claim 22 wherein either the unified head or the other head is staked in situate and the staking operation interacts with the filler.

* * * * *